(12) United States Patent
Lapp et al.

(10) Patent No.: US 6,417,453 B1
(45) Date of Patent: Jul. 9, 2002

(54) CABLE SLEEVE CONSISTING OF A COVERING BODY AND AT LEAST ONE FRONT-FACE SEALING BODY

(75) Inventors: Oliver Lapp, Wuppertal; Rainer Zimmer, Schalksmühle, both of (DE)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/600,524

(22) PCT Filed: Apr. 28, 1999

(86) PCT No.: PCT/DE99/01251

§ 371 (c)(1),
(2), (4) Date: Sep. 22, 2000

(87) PCT Pub. No.: WO00/30231

PCT Pub. Date: May 25, 2000

(30) Foreign Application Priority Data

Nov. 18, 1998 (DE) .......................................... 198 53 203

(51) Int. Cl.[7] .................................................. H01R 4/00
(52) U.S. Cl. ........................................................ 174/93
(58) Field of Search ............................ 174/74 R, 74 A, 174/77 R, 84 R, 86, 88 R, 93

(56) References Cited

U.S. PATENT DOCUMENTS

| | | | | |
|---|---|---|---|---|
| 3,337,681 A | * | 8/1967 | Smith ........................... | 174/92 |
| 3,769,443 A | * | 10/1973 | Pierzchala et al. ............. | 174/38 |
| 4,845,314 A | * | 7/1989 | Pichler et al. .................. | 174/92 |
| 4,861,946 A | * | 8/1989 | Pichler et al. .................. | 174/92 |
| 5,059,748 A | * | 10/1991 | Allen et al. ..................... | 174/87 |
| 5,198,620 A | * | 3/1993 | Behrendt et al. .......... | 174/74 R |
| 5,235,134 A | * | 8/1993 | Jaycox ........................... | 174/87 |
| 5,545,851 A | * | 8/1996 | Meltsch et al. ............ | 174/74 R |
| 5,949,024 A | * | 9/1999 | Froehilich .................. | 174/77 R |
| 6,025,561 A | * | 2/2000 | Dams ............................ | 174/91 |
| 6,231,051 B1 | * | 5/2001 | Mueller et al. .............. | 277/603 |

FOREIGN PATENT DOCUMENTS

DE WO-96/32660 A * 10/1996 ............ G02B/6/44

* cited by examiner

Primary Examiner—Dean A. Reichard
Assistant Examiner—William H. Mayo, III

(57) ABSTRACT

A cable sleeve includes a covering body having a front-face end defining a circumferential, conically tapered flange. At least one front-face sealing body is positioned adjacent the covering body and has a circumferential, U-shaped sealing groove. A ring seal in inserted into the sealing groove of the sealing body. The ring seal has an L-shaped cross-section and has a first leg that received within the sealing groove of the sealing body and a second leg having a tapered course on both sides broadening towards the first leg. A straining ring fastens the ring seal between the flange of the covering body and the sealing groove of the sealing body.

14 Claims, 6 Drawing Sheets

CABLE SLEEVE CONSISTING OF A COVERING BODY AND AT LEAST ONE FRONT-FACE SEALING BODY

CROSS-REFERENCES TO RELATED APLICATIONS

This application claims the benefit of foreign priority from International Application No. PCT/DE99/01251, which was published as International Publication No. WO 00/30231 in the German language on May 25, 2000, and which claims the benefit of foreign priority from German Patent Application Serial No. 198 53 203.2 filed Nov. 18, 1998.

BACKGROUND OF THE INVENTION

1. Field of the Invention

The present invention relates to a cable sleeve comprising a covering body and at least one front-face sealing body with a circumferential, U-shaped sealing groove and a ring seal. The covering body comprises at its front-face end a circumferential, conically tapered flange which, together with the ring seal inserted into the sealing groove, is engaged by a straining ring.

2. Description of the Related Art

EP 0 877 716-A2 discloses a cable sleeve which comprises a covering body comprising an added flange, to which a sealing system comprising an annular seal is pressed with the help of a straining ring.

EP 0 844 717-A2 discloses a straining ring for flanged joints in cable sets or tubes. The straining ring comprises several partial ring segments that are engaged by a straining band. During straining of the straining band, the partial ring segments are radially inwardly pressed onto a sealing system.

WO 96/32660 discloses a hood sleeve formed of a sealing body and a hood body. A sealing ring is housed in a sealing groove comprising a variable volume. As a result of deformation that occurs during closing, the sealing ring is pressed to the inner wall of the hood body by narrowing the sealing groove, for example with the help of an eccentric.

BRIEF SUMMARY OF THE INVENTION

The problem underlying the present invention is to create a cable sleeve, in which the sealing ratios between the sealing body and the covering body are improved with the help of a suitable ring seal and a straining ring being adapted thereto. According to the present invention, the problem is solved with a cable sleeve of the above-mentioned type wherein the ring seal comprises as its basic cross-section an L-shape. The cross-section of the first leg of the L-shape is adapted to that of the sealing groove of the sealing body and the second leg of the L-shape has at both of its sides a tapered cross-section broadening towards the first leg. The tapered course of the second leg corresponds at the one side of the course of the tapered flange and at the other side to the course of the conical groove wall of the ring groove inside the straining ring. The straining ring comprises a circumferential projection acting on the first leg of the ring seal positioned in the sealing groove of the sealing body.

As compared to the known prior art, it is a decisive advantage in the sealing system according to the present invention that the straining ring exerting the sealing pressure not only effects an all-over deformation of the ring seal, but that, during the closing operation, the sealing towards the covering body is done via the groove wall of the ring groove of the straining ring and the sealing towards the sealing body is done via the action of a circumferential projection on the ring seal. For this reason the ring seal is formed to have an L-shaped basic form, wherein the first leg, which is in general the shorter one, is adapted to the shape of the groove of the sealing body. The second leg of the L-shaped ring seal is formed to have a conical shape and serves for sealing against a circumferential flange of the covering body. The circumferential ring groove in the straining ring is formed to have a corresponding conical shape, so that, when the straining ring is closed and its diameter is reduced, the straining ring slides along on the conical counter-surfaces. As a result, an increasing pressure is exerted on the ring seal, wherein the circumferential projection at the straining ring exerts pressure on the first leg of the ring seal. Further, guiding elements having the shape of a fixing groove and that of a fixing projection are provided in the straining ring and in the sealing body, respectively, for mutual positioning. The straining ring according to the present invention comprises several straining ring parts, and preferably two identical straining ring parts, which are fastened on the sealing region by means of closing elements. The closing elements are preferably threaded bolts or screws arranged in pivot bearings so as to be non-removable and can, after positioning of the straining ring parts, be threaded into counter-bearings of the corresponding straining ring part. The straining ring parts are pulled against each other by threading the screws of the straining ring and thereby pressing the sealing system together in the above-described manner.

BRIEF DESCRIPTION OF THE SEVERAL VIEWS OF THE DRAWINGS

The present invention will be illustrated in more detail referring to the following figures in which like reference letters designate like parts in the various views and in which.

DETAILED DESCRIPTION OF THE INVENTION

Figure 1:
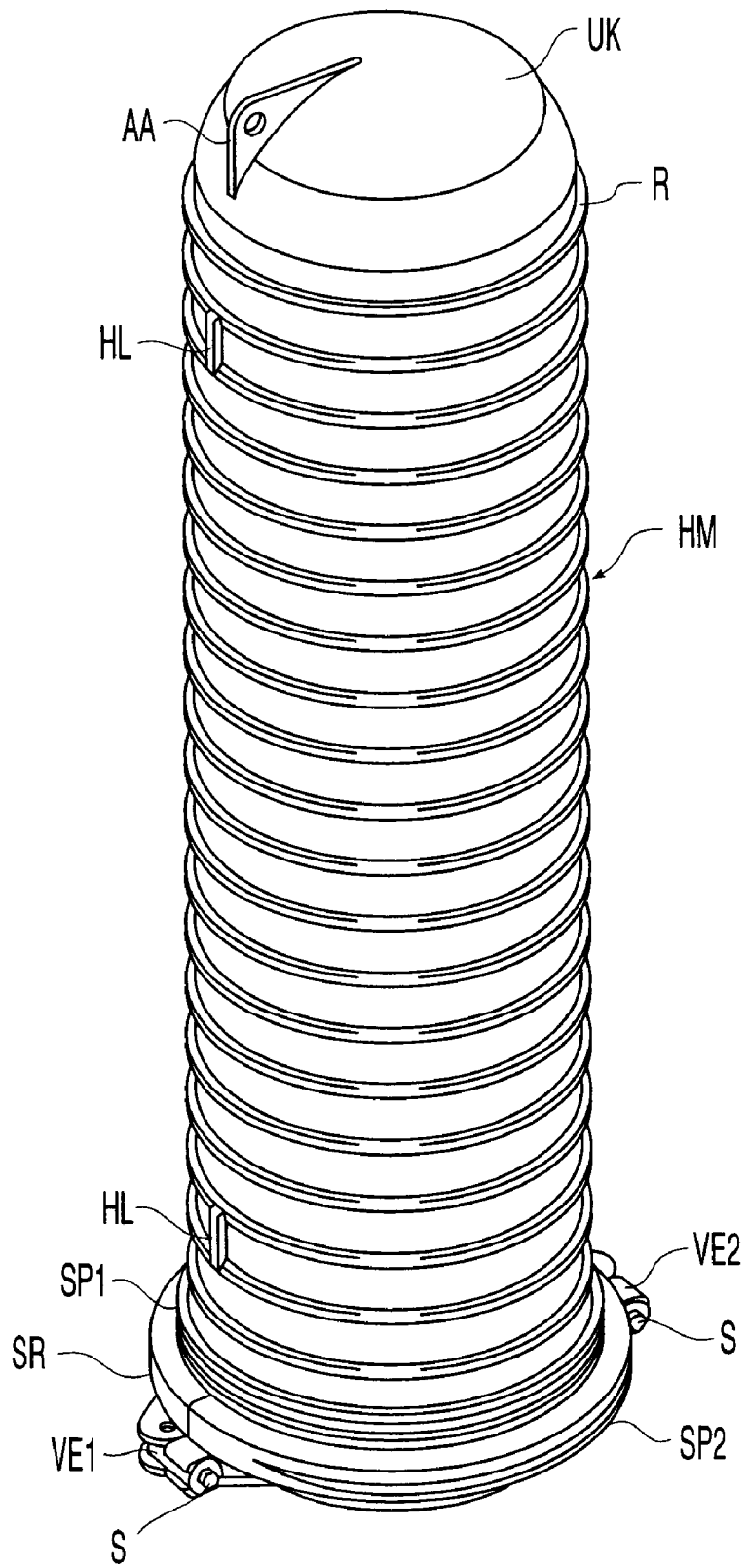
FIG. 1 shows an assembled cable sleeve according to the present invention.

FIG. 1 shows a hood sleeve HM in its assembled state. It is obvious therefrom that the hood sleeve comprises a covering body UK, which is at one frontal side closed to have a hood-like shape. At the opposing frontal side, the hood sleeve HM is closed by a sealing body, which is sealingly inserted towards the covering body UK with the help of a sealing system according to the present invention. Besides the ring seal, which is not visible in FIG. 1, a straining ring SR comprising two straining ring parts SP1 and SP2 is provided for this purpose. Compression of the straining ring SR is achieved with the help of closing elements VE1 and VE2 being correspondingly arranged at the ends of the straining ring parts SP1 and SP2. The reduction of the diameter of the straining ring generates the required closing pressure upon the ring seal. The hood sleeve HM is further provided with holding brackets HL, with the help of which a mast fixing is enabled. Further, a suspension device AA is provided for suspending the hood sleeve HM from a carrier cable. Ribs R are provided for increasing the mechanical strength and stiffening the covering body UK.

Figure 2:
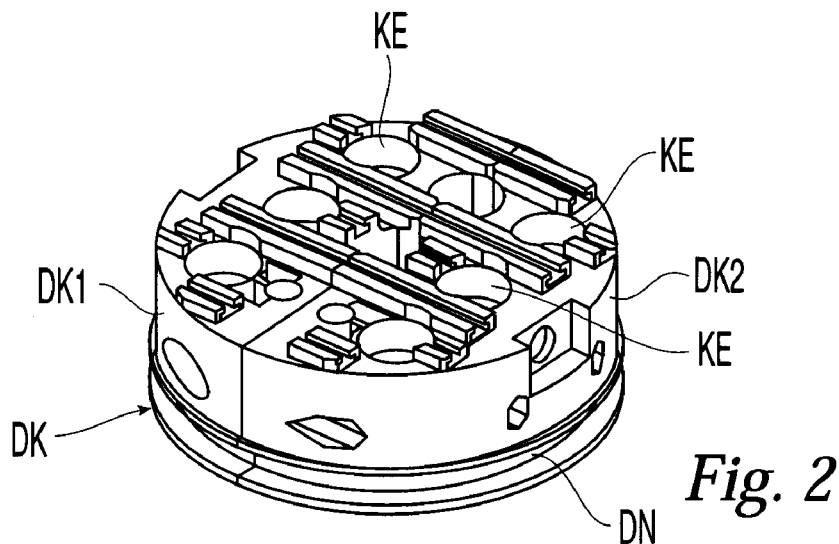
FIG. 2 shows a sealing body according to the present invention.

FIG. 2 illustrates a sealing body DK comprising two sealing body parts DK1 and DK2. Cable entrances KE for inserting cables are provided in the sectional plane as well as in the other parts of the sealing body. Non-cut (e.g., express) cables can also be inserted through the cable entrances KE in the sectional plane. The sealing body is provided with circumferential, U-shaped sealing groove DN, into which a corresponding ring seal for sealing against the covering body UK is inserted. Such a sealing body DK is in principle known and is already being used for longitudinally split cable sets, in which a longitudinally split sleeve tube is tightly compressed on the sealing body or upon the circumferential ring seal, respectively. The problem solved by the present invention includes among others that such a sealing body can also be used for a hood-shaped covering body. Since hood sleeves, as a result of the rigid diameter, do not allow compression, as in a longitudinally split cable set, the sealing system according to the present invention has been developed.

Figure 3:
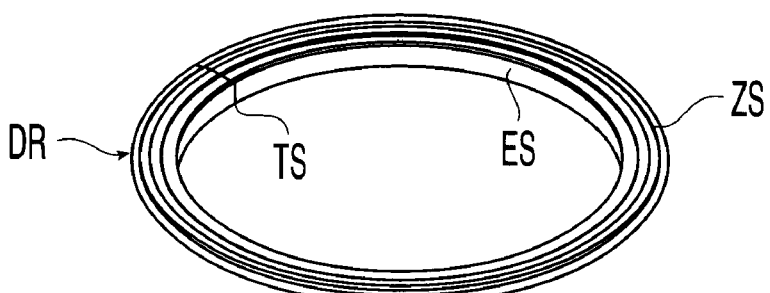
FIG. 3 shows a ring seal according to the present invention.

FIG. 3 shows the ring seal DR, which has been developed for the new sealing system and whose cross-section comprises an L-shape. The cross-sectional shape is not clearly visible in this illustration, but the first leg ES and the second leg ZS of the L-shape are clearly shown in FIGS. 5–7. The first leg ES seats into the sealing groove of the sealing body during assembly, while the second leg ZS seals against the covering body. Further, a split ring seal DR can be inserted, wherein known connecting measures are then taken at the separation location TS.

Figure 4:
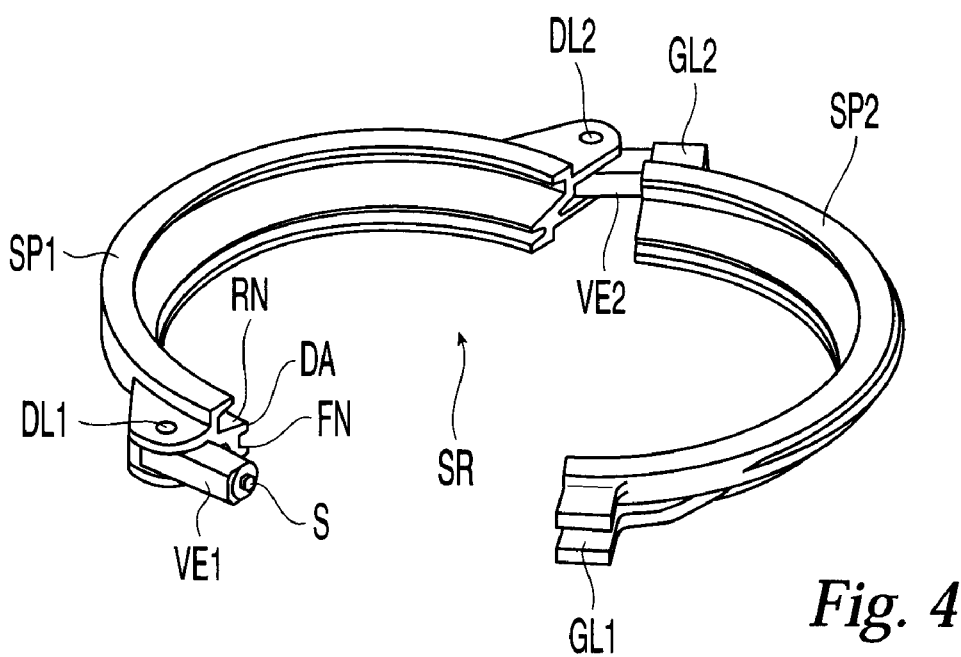
FIG. 4 shows a straining ring according to the present invention.

FIG. 4 illustrates the straining ring SR forming, in conjunction with the previously described ring seal DR, the sealing system according to the present invention. The straining ring SR in the present case comprises two identical straining ring parts SP1 and SP2 connected to each other via closing elements VE1 and VE2.

The closing elements VE1 and VE2 are rotatably arranged in pivot bearings DL1 and DL2, respectively, at the ends of the straining ring part SP1. After assembly of the straining ring parts SP1 and SP2 to the already pre-mounted sealing body DK and ring seal DR, the closing elements VE1 and VE2 are with their closing bolts or screws threaded into counter-bearings GL1 and GL2, respectively, of the corresponding straining ring part SP2. Finally, by tightening the closing screws, the two straining ring parts SP1 and SP2 are pulled together until the required sealing pressure is applied. The reception profile of the straining ring SR or of the straining ring parts SP1 and SP2, respectively, is composed of the ring groove RN, a circumferential projection DA and a fixing groove FN lying therebelow. When the straining ring SR or the straining ring parts SP1 and SP2, respectively, are put on, the circumferential flange FL of the covering body UK and the second leg ZS of the already pre-mounted ring seal DR are inserted into the ring groove RN. When doing so, the position of the projection DA for acting upon the first leg ES of the ring seal DR, which has already been inserted into the circumferential sealing groove DN of the sealing body, is automatically achieved. What is also automatically achieved in this mounting procedure is insertion of the circumferential fixing projection of the sealing body DK into the fixing groove FN, if such a fixing projection exists on the sealing body.

In the illustrated embodiment, the two closing elements VE1 and VE2 are rotatably arranged in bearings at one straining ring part SP1. The second straining ring part SP2 can thus be moved relative to the first straining ring part SP1 in the direction of the pivot of the closing element, depending on how far the two corresponding closing screws S or nuts, respectively, are screwed into or onto, respectively, a thread of the closing elements VE1, VE2. Hence, the two straining ring parts SP1 and SP2 are at one side not only arranged in bearings to be mutually rotatable, but can also be mutually moved in the direction of the pivot. By an alternate tightening of the two closing screws S, the ring seal DR is fastened between the straining ring SR and the hood sleeve HM as well as between the straining ring SR and the sealing body DK. Fastening of the straining ring SR at two sides has the advantage that action of the closing forces is uniformly distributed over the circumference. Were the straining ring parts SP1 and SP2 arranged to be only mutually rotatable (and not also mutually movable), no high pre-tightening force would act on the ring seal DR in the region of the pivot. The hood sleeve HM would leak first in this region.

Figure 5:
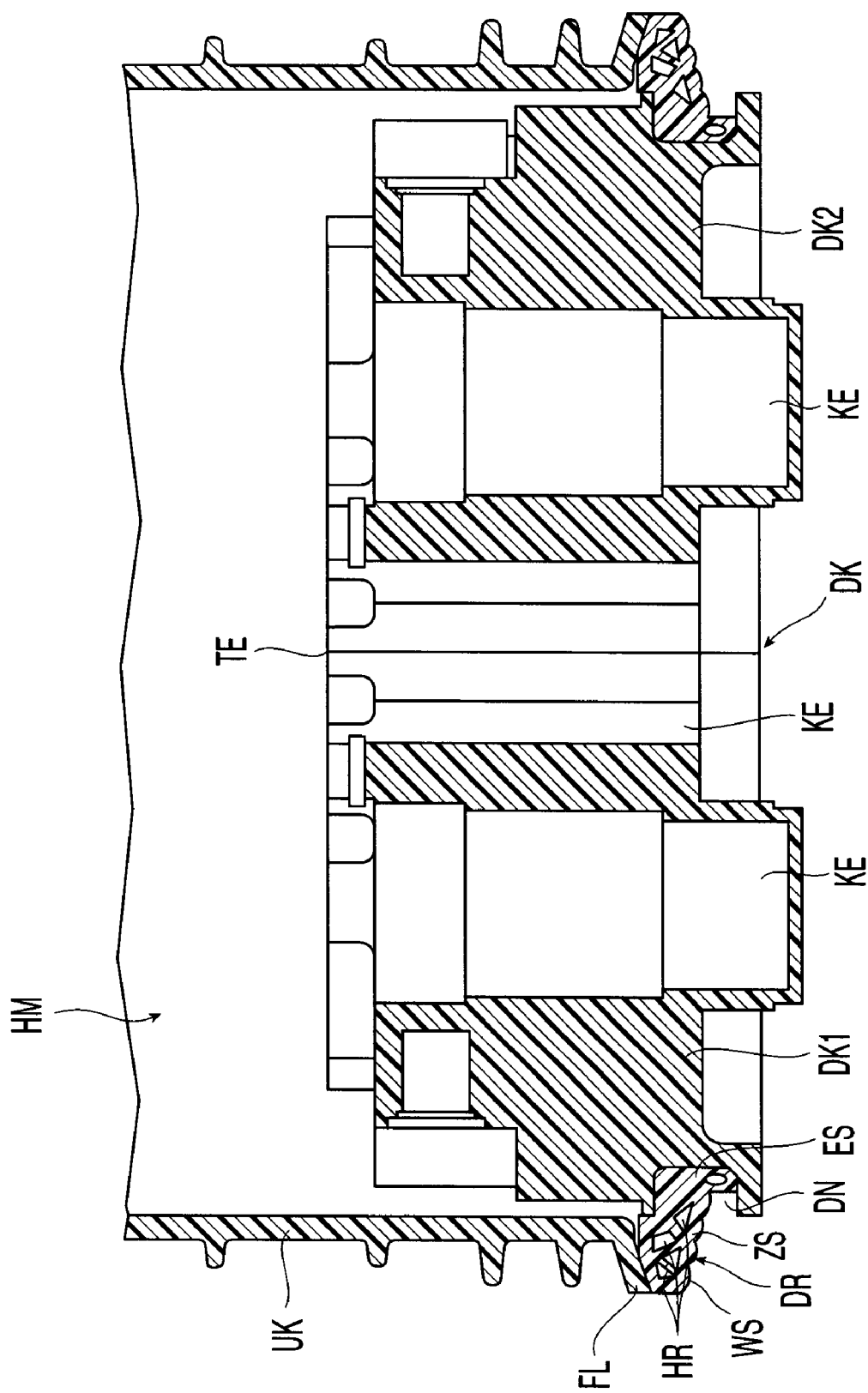
FIG. 5 shows a cross-sectional view of the cable sleeve in the sealing region before mounting of the straining ring.

FIG. 5 shows the beginning of the assembly for sealing the hood sleeve HM. In this state the ring seal DR is already inserted into the U-shaped sealing groove DN of the sealing body DK comprising two sealing body parts DK1 and DK2. In this cross-sectional illustration it can be seen that the ring seal DR is with its first leg ES seated into the sealing groove DN of the sealing body DK, while the second leg ZS, in the present case the longer leg, is positioned closely to the sealing flange FL of the covering body UK. As can be seen from the cross-sectional view of the ring seal DR, both sealing surfaces of the second leg ZS extend toward the first leg ES in a conically widening manner. Further, it can be seen that the ring seal DR is provided with several annularly extending cavities HR to ensure the required flexibility. In addition, it is shown that the conically extending surfaces of the second leg ZS are provided with a wavy structure WS ensuring an improvement of the sealing characteristics. Still further, cable entries KE are shown wherein the middle cable entry is located in the separating area TE of the sealing body DK.

Figure 6:
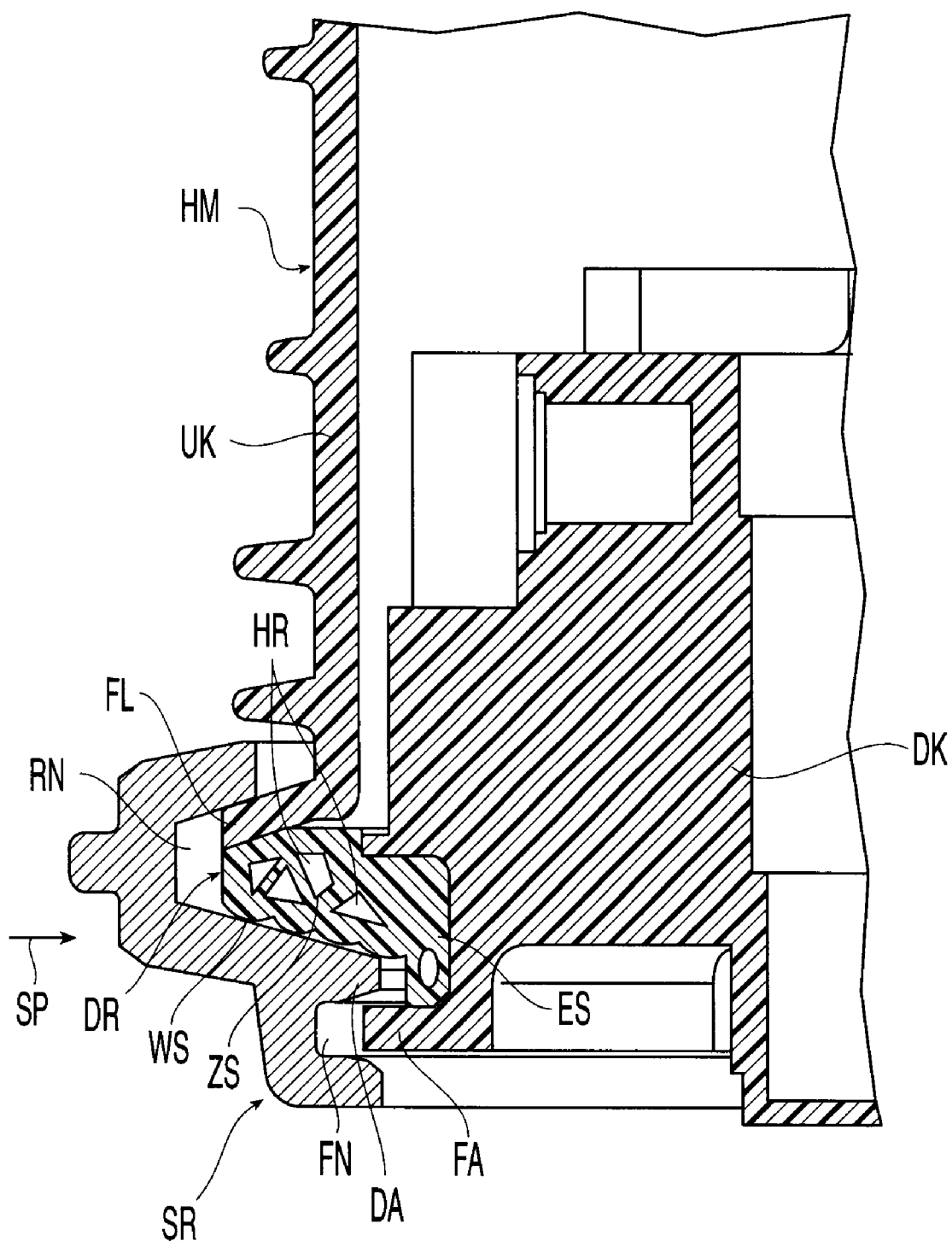
FIG. 6 shows a cross-sectional view in the sealing region including an added straining ring before the sealing system is fully pressed together.

FIG. 6 shows the following step of the closing operation. The straining ring SR is already located in its position, so as to encompass with its first flank the flange FL of the covering body UK of the hood sleeve HM and with its second flank the conically extending seal surface of the second leg ZS of the ring seal DR. The ring seal DR and the ring groove RN of the straining ring SR are formed with respect to their cross section so that the circumferential projection DA is able to act upon the first leg ES of the ring seal DR being seated into the sealing groove DN of the sealing body DK. Thus, the first leg ES of the ring seal DR is prestressed between the sealing body DK and the straining ring SR. As can be seen in FIG. 6, the stress direction SP is shown by an arrow in which direction the straining ring SR is moved radially during the subsequent fastening operation.

Figure 7:
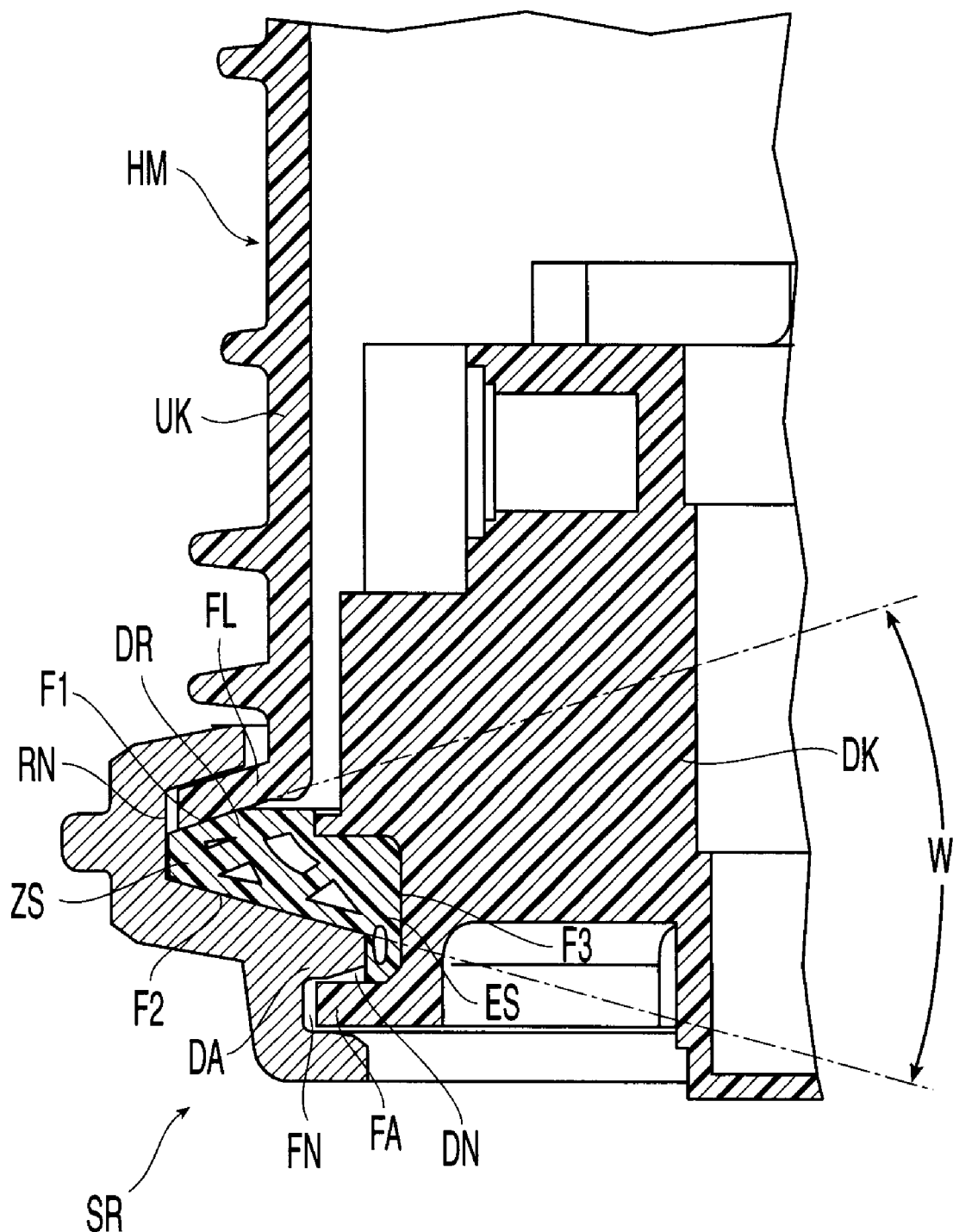
FIG. 7 shows a cross-sectional view in the sealing region after the sealing system is fully pressed together.

FIG. 7 shows the final state of the closed sealing system. As can be seen, the sealing is provided between the covering body UK and the sealing body DK at the sealing surface F1 between the flange and the ring seal DR and the sealing surface F2 between the ring seal DR and the second flank of the straining ring SR. In addition, the first leg ES of the ring seal DR is pressed against the sealing surface F3 within the sealing groove DN due to the projection DA of the straining ring SR. In FIG. 7, the angle W at which the sealing surfaces F1 and F2 are inclined, is indicated. This angle also corresponds to the angle opening of the ring groove RN in the straining ring SR, when the outer wall of the flange FL extends parallel to the inner wall of the first flank of the straining ring SR. Of course, the ring seal DR is formed such that the required closing pressure is maintained in the final state. The material of the ring seal is an elastomer, preferably silicone. To compensate the process tolerance, the longest possible prestressing paths of the ring seal DR are utilized. This is primarily achieved by providing annular cavities HR within the sealing profile. Utilizing cavities HR, prestressing paths can be realized which would not be possible with massive seals, since silicone materials are incompressible. The cavities HR in the seal are formed such that the remaining webs are not perpendicular to the prestressing direction, and thus, maintain defined deformations during the closing operation. The wavy structures WS provided on the surfaces F1, F2 and F3 of the ring seal DR create an additional contact pressure. Beside the function of sealing, the ring seal DR has the additional object to form a flange, onto which the covering body UK can be put while pre-assembling, so that the assembling is facilitated due to the geometry of the ring seal. As can be further seen in FIG. 7, the outer groove flank of the sealing groove DN of the sealing body DK forms a fixing projection FA which seats into a corresponding fixing groove FN of the straining ring SR. Thus, a positioning retention is assured so that the sealing body DK cannot wander off.

Figure 8:
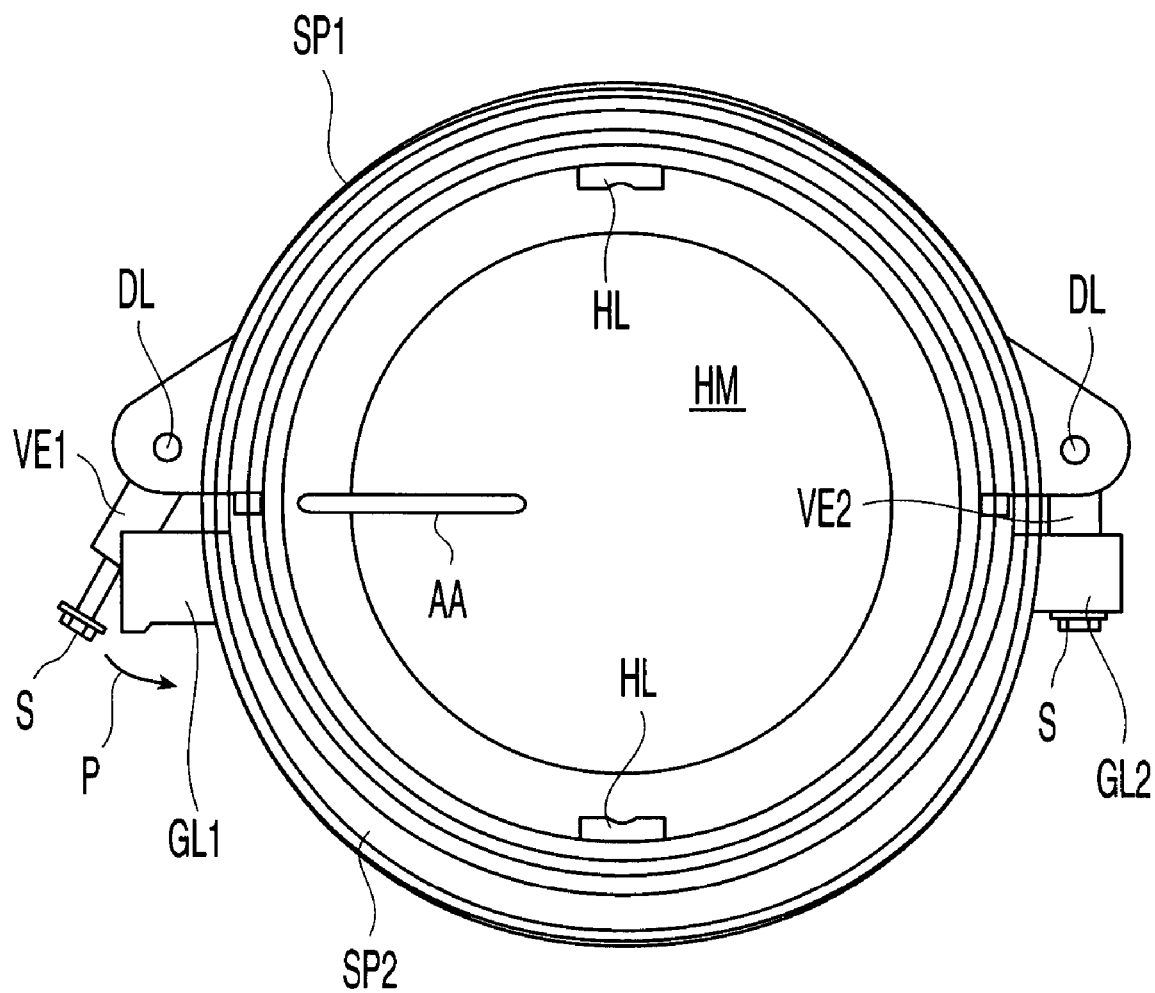
FIG. 8 shows a top view of the cable sleeve according to the present invention.

FIG. 8 shows in a top view the arrangement of the hood sleeve HM, in which the closing means at the right side is already pre-assembled with the closing element VE2. At the left side, the closing element VE1 rotatably mounted in the pivot bearing DL is next pivoted in the direction of the arrow P into the counter-bearing GL1 of the straining ring part SP2. Subsequently the straining ring parts SP1 and SP2 are pulled against each other by mutual tightening of both screws S until the required closing pressure is obtained. Further, holding brackets HL and the suspension projection AA are recognizable.

In summary, known sealing bodies for longitudinally split cable sets may now be used for hood sleeves with an appropriate ring seal according to the present invention. In addition to providing a sealing function, the ring seal also provides mounting assistance, as the hood sleeve used as a covering body can be placed upon the ring seal which is already positioned in the sealing body. Furthermore, the ring groove of the straining ring is adapted to the cross section of the ring seal. Thus, an optimal sealing result can be obtained in the prevailing conditions, especially since additional radial contact pressure of the first leg of the ring seal in the sealing groove also produces a radial sealing pressure. Because of the annular cavities in the ring seal, there are large initial prestressing paths possible. Because of the mechanical fixation of the sealing body in the straining ring with support of the fixing means, the sealing body is fixed in a way that the initial tension of the ring seal, also at outer mechanical stresses, won't be reduced. According to the illustrated embodiments of the present invention, the straining ring parts are not linked together by only one turning knuckle. Because of the tangential connection with the closing elements, the straining ring parts can be alternately deployed in sealing position so that one-sided stress of the ring seal can be excluded, as it would not be when only one turning knuckle is deployed. Therefore, a steady distribution of pressure is possible during the locking action.

That which is claimed is:

1. A cable sleeve comprising:

a covering body having a front face end defining a circumferential, conically tapered flange;

at least one front face sealing body positioned adjacent the front face end of the covering body, the at least one sealing body having a circumferential groove;

a ring seal inserted into the sealing groove of the sealing body; and a straining ring having a conically tapered ring groove engaging the flange of the covering body and the ring seal;

wherein the cross section of the ring seal is substantially an L-shape and the ring seal comprising a first leg of the L-shaped adapted to be received within the sealing groove of the at least one sealing body and a second leg of the L-shape having a tapered course on both sides broadening towards the first leg, the tapered course of the second leg corresponding on one side to the conically tapered flange of the covering body and on the other side to the conically tapered ring groove of the straining ring, wherein the ring seal has a Plurality of sealing surfaces that define an angle equal to the angle between the inner surface of the flange of the covering body opposite the ring seal and the inner surface of the ring groove of the straining ring opposite the ring seal.

2. The cable sleeve of claim 1, wherein the straining ring comprises a circumferential projection acting on the first leg of the ring seal.

3. The cable sleeve of claim 1, wherein the ring seal has at least one annual inner cavity.

4. The cable sleeve of claim 1, wherein, each of the plurality of sealing surfaces has a circumferential wavy structure.

5. The cable sleeve of claim 1, wherein the straining ring is formed from a plurality of straining ring parts that are fastened together by means of closing elements.

6. The cable sleeve of claim 5, wherein the closing elements comprise a first end rotatably arranged in a pivot bearing provided on at least one of the straining ring parts and a second end opposite the first end that engages a counter-bearing on another of the straining ring parts to fasten the straining ring parts together.

7. The cable sleeve of claim 1, wherein the straining ring has a circumferential fixing groove and the at least one sealing body comprises a corresponding circumferential fixing projection that is received within the fixing groove of the straining ring.

8. The cable sleeve of claim 1, wherein the covering body comprises a tube.

9. The cable sleeve of claim 8, wherein the tube of the covering body is longitudinally slit.

10. The cable sleeve of claim 8, wherein the covering body is a sleeve hood having a closed end opposite the front-face end.

11. The cable sleeve of claim 1, wherein the covering body comprises at least one suspension projection.

12. The cable sleeve of claim 1, wherein the covering body comprises at least one holding bracket.

13. The cable sleeve of claim 1, wherein the covering body comprises ribs for structural reinforcement.

14. The cable sleeve of claim 1, wherein the ring seal comprises an elastomer material.

\* \* \* \* \*